United States Patent
Jan et al.

(10) Patent No.: US 7,206,387 B2
(45) Date of Patent: Apr. 17, 2007

(54) RESOURCE ALLOCATION FOR VOICE PROCESSING APPLICATIONS

(75) Inventors: Ea-Ee Jan, Hawthorne, NY (US); Benoit Maison, White Plains, NY (US); Andrzei Sakrajda, White Plains, NY (US)

(73) Assignee: International Business MAchines Corporation, Armonk, NY (US)

( * ) Notice: Subject to any disclaimer, the term of this patent is extended or adjusted under 35 U.S.C. 154(b) by 222 days.

(21) Appl. No.: 10/645,051

(22) Filed: Aug. 21, 2003

(65) Prior Publication Data

US 2005/0041788 A1  Feb. 24, 2005

(51) Int. Cl.
*H04M 1/64* (2006.01)
(52) U.S. Cl. .................... 379/88.01; 379/219; 704/270
(58) Field of Classification Search ............. 379/88.01, 379/88.18, 201.01, 219, 242; 704/270, 255
See application file for complete search history.

(56) References Cited

U.S. PATENT DOCUMENTS

| | | | |
|---|---|---|---|
| 6,119,087 A * | 9/2000 | Kuhn et al. ................. | 704/270 |
| 6,418,201 B1 | 7/2002 | Holland et al. ........... | 379/88.18 |
| 6,876,941 B2 * | 4/2005 | Nightingale ................ | 710/305 |
| 2004/0015351 A1 * | 1/2004 | Gandhi et al. .............. | 704/240 |

\* cited by examiner

*Primary Examiner*—Ovidio Escalante
(74) *Attorney, Agent, or Firm*—Anne Vachon Doughert

(57) ABSTRACT

A voice processing system is provided in which sets of engines running on a plurality of servers are configured differently from one another. The sets of engines may be configured to achieve different trade-offs between performance of a task and resources required to perform the task. In the voice processing system, a task routing server is provided that assigns different sets of sub-tasks to different sets of task engines. The number of engines used to perform a task and the number of engines in each set are adjusted. By adjusting the parameters settings for the set of engines based on the type of application, the particular requirements of the application, or the nature and importance of the subtasks, for example, advantages such as improvement of resource utilization and the hardware and software costs reduction may be obtained.

18 Claims, 4 Drawing Sheets

|       311       |    312   |      313      |   314    |      315       |
|-----------------|----------|---------------|----------|----------------|
| Task Server     | Engines  | Grammars      | Accuracy | Acoustic model |
| 510             | Type A   | NY Cities, NJ Cities | 35 | Names     |
|                 | Type A   | NY Cities, NJ Cities | 35 | Names     |
|                 | Type B   | yes-no        | 80       | General        |
| 520             | Type A   | NY Cities, NJ Cities | 35 | Names     |
|                 | Type B   | yes-no        | 80       | General        |
|                 | Type B   | yes-no        | 80       | General        |
|                 | Type C   | Numbers       | 50       | Alphanumeric   |
| 530             | Type C   | Numbers       | 50       | Alphanumeric   |
|                 | Type C   | Numbers       | 50       | Alphanumeric   |
|                 | Type C   | Numbers       | 50       | Alphanumeric   |

RESOURCE ALLOCATION FOR VOICE PROCESSING APPLICATIONS

FIELD OF THE INVENTION

The present invention relates generally to a voice processing system, and more particularly, to a system that allocates resources for voice processing applications.

BACKGROUND

With recent progress in the data processing technology, more systems are made available for voice processing. These voice processing systems may be merged together with other capabilities such as facsimile, e-mail and the like. In operation, a user connects to the voice processing systems to request access to any of a plurality of different applications, including fax-on-demand, directory assistance, e-commerce, voice-mail, personal information management, database access and the like. The interaction between the user and the voice processing systems could take many forms, including: a remote user dialing into a computerized voice response system, a user speaking in a microphone on a desktop computer connected to a network, a user of personal digital assistants connected to a wireless network, a user as a participant of a meeting with several microphones around the room, or a user of other devices with speech input capability connected to a computer network.

In voice processing systems, voice processing resources such as processor time and memory space are utilized to perform tasks on the accessed application. Exemplary voice processing systems include a plurality of servers connected by a network, each server including engines for performing tasks including speech recognition, speech synthesis, speaker identification, and the like. In voice processing systems connected to a telephone network, in order to provide services over the telephone, whether it is by landline, mobile, voice over IP, or the like, telephony equipment is also included in one or more servers.

With recent progress, it is desirable to access large applications with a large number of requests and large volumes of data. For example, in a telephony-based voice processing system, thousands of users may be calling simultaneously, and a server dedicated to speech recognition tasks, for example, may have to handle many grammars containing hundreds of thousands or millions of entries, such as lists of products, people, addresses, or city names.

In these voice processing systems, one or more servers are dedicated to one or more of the tasks. Thus, any given server can handle all the tasks in one class of tasks, and a task is typically allocated by selecting the least loaded server.

Since any of the engines on the servers may be required to handle any task in its class, each server must have the resources to handle the most resource-intensive of the tasks. Hence all engines require the same, large and costly resources.

SUMMARY OF THE INVENTION

In accordance with the exemplary aspects of this invention, a voice processing system is provided in which, for resource allocation, sets of engines running on a plurality of servers are configured differently from one another.

In accordance with the exemplary aspects of this invention, applications are deployed using fewer resources. In these exemplary aspects, processor and memory usage for each application, for example, is reduced.

In accordance with the exemplary aspects of this invention, a task routing system is provided that assigns different sets of sub-tasks to different sets of task engines. In these exemplary aspects, for resource allocation, the sets of engines may be configured to achieve different trade-offs between performance of a task and resources required to perform the task.

In accordance with the exemplary aspects of this invention, parameter settings for the set of engines are adjusted. In various exemplary aspects, the type of engines and the number of engines in a set selected to perform a task are adjusted. In other exemplary aspects, the grammars allocated to the sets of engines are adjusted. In other exemplary aspects, the performance and accuracy settings for the sets of engines are adjusted. In yet other exemplary aspects, the acoustic models allocated to the sets of engines are adjusted.

In accordance with the exemplary aspects of this invention, by adjusting the parameter settings for the set of engines and selecting the set of engines based on the type of application, the particular requirements of the application, or the nature and importance of the subtasks, for example, advantages such as improvement of resource utilization and the hardware and software costs reduction may be obtained.

In another exemplary aspect of the present invention, the parameter settings for the set of engines may be dynamically altered to respond to changes in the requirements, and real-time operating statistics.

BRIEF DESCRIPTION OF THE DRAWINGS

FIG. 3 shows an exemplary configuration file in association with a task routing system according to the exemplary aspects of the present invention.

DETAILED DESCRIPTION OF THE INVENTION

Figure 1:
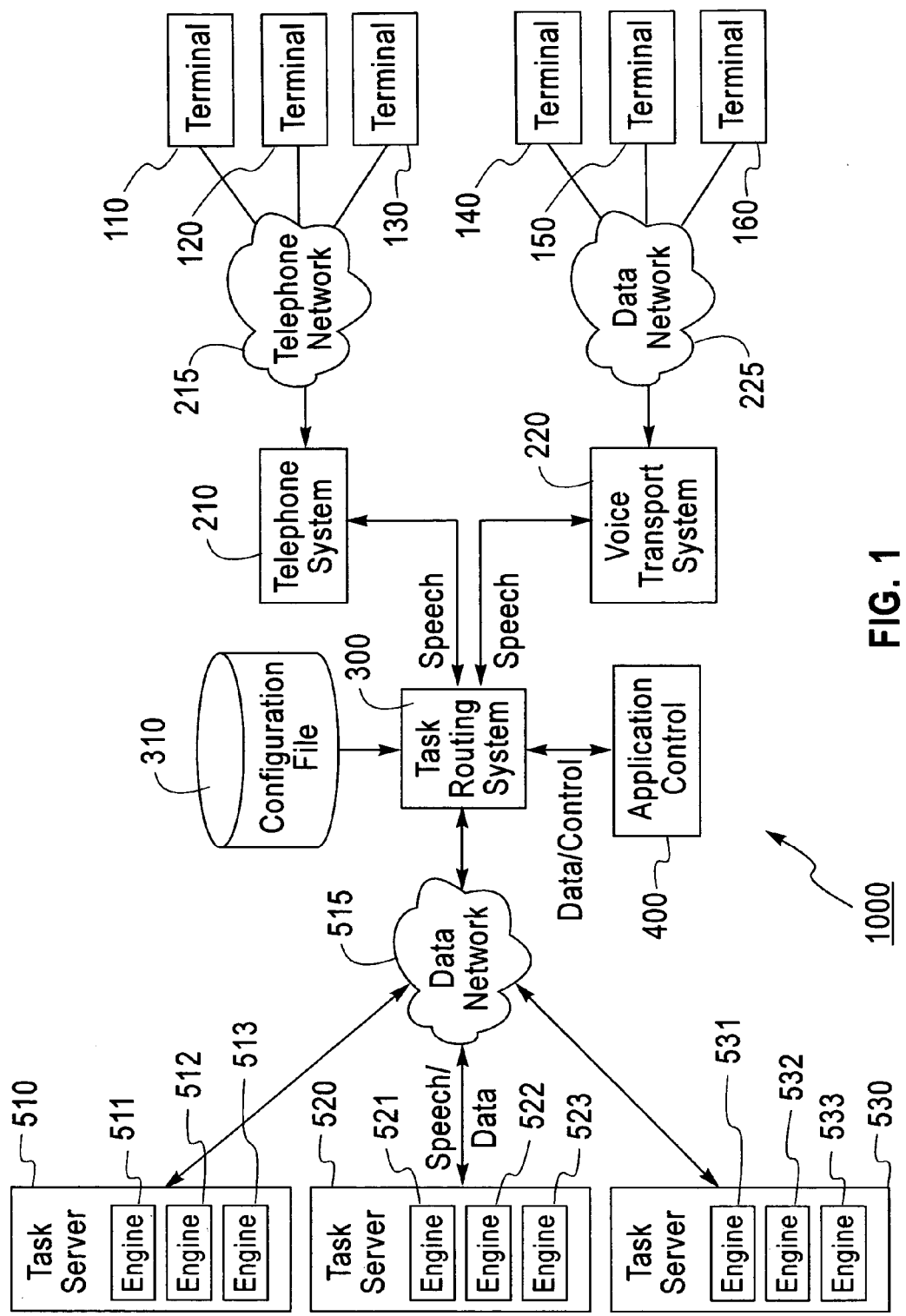
FIG. 1 shows an exemplary speech processing system embodying the exemplary aspects of the present invention.

The following description details how exemplary aspects of the present invention are employed. Throughout the description of the invention, reference is made to FIGS. 1-4. When referring to the figures, like structures and elements shown throughout are indicated with like reference numerals.

Description of the Preferred Embodiments

In FIG. 1, an exemplary voice processing system 1000 embodying the exemplary aspects of the present invention is shown. It is initially noted that the voice processing system 1000 of FIG. 1 is presented for illustration purposes only, and is representative of countless configurations in which the exemplary aspects of the present invention may be implemented. Thus, the present invention should not be considered limited to the system configuration shown in the figure.

As shown in FIG. 1, the voice processing system 1000 includes a telephone system 210, a voice transport system 220, and a task routing system 300. Terminals 110–130 are connected to telephone system 210 via telephone network 215 and terminals 140–160 are connected to voice transport system 220 via data network 225. As shown in FIG. 1, telephone system 210 and voice transport system 220 are connected to task routing system 300.

The task routing system 300 is also connected to application controller 400 and a configuration file 310. In the voice processing system 1000, task servers 510–530 each comprising engines 511–513, 521–523 and 531–533, respectively, are connected to task routing system 300 via data network 515.

In an exemplary embodiment, during an initialization phase of operation, the task routing system 300 prepares the server configurations according to an optimization scheme by varying parameter settings for engines and distributing these engines among the servers 510–530. In this exemplary embodiment, the task routing system 300 computes a configuration based only on the location of required files and a minimization of the number of servers utilized. The task servers 510–530 read this configuration, create the requested engine processes, and wait for task requests from the task routing system 300.

In operation, a request is sent from a remote user over network 215 or 225 through one of terminals 110–160. In response to the request, terminals 110–160 run a variety of voice processing and terminal applications.

The task routing system 300 receives the request and connects appropriate applications from the application controller 400 to the requesting terminal. The task routing system 300 then analyzes the request in response to messages received from the application controller 400 in order to ascertain the particular resources from the task servers 510–530 which are required to process the particular task.

Based upon the particular arriving task and the application, the routing system 300 determines which particular set of engines are necessary in order to process the request. The task routing system 300 is connected to a configuration file 310 which includes a record of the configuration for the engines 511–513, 521–523 and 531–533 respectively available at task servers 510–530. The task routing system 300 then selects the set of engines from the engines 511–513, 521–523 and 531–533 in the task servers 510–530 to perform the task according to the configuration of the engines 511–513, 521–523 and 531–533 stored in the record. Each of the task servers 510–530 communicates with the routing system 300 via a standard or proprietary protocol over data network 515.

As discussed above, though the exemplary embodiment above describes voice processing system 1000 in a particular embodiment, the voice processing system 1000 may be any system known in the art for processing voice. Thus, it is contemplated that the voice processing system 1000 may be configured and may include various topologies and protocols known to those skilled in the art.

For example, it is to be appreciated that though FIG. 1 only shows 6 terminals and 3 task servers with 3 engines running on each server, the various exemplary aspects of the present invention is not limited to any particular number of terminals and task servers or any particular number of engines for each server. Further, it should be understood that the servers are not restricted to containing the same number of engines. Thus, it is contemplated that any number of terminals, task servers, and engines may be applied in the present invention.

Further, it is to be appreciated that though FIG. 1 shows that the task routing system 300 prepares the server configuration, this embodiment is merely for illustrative purposes only. That is, this embodiment in no way limits the present invention to this layout, and that any method of preparing the configuration may be applied accordingly to the various aspects of the invention.

Figure 2:
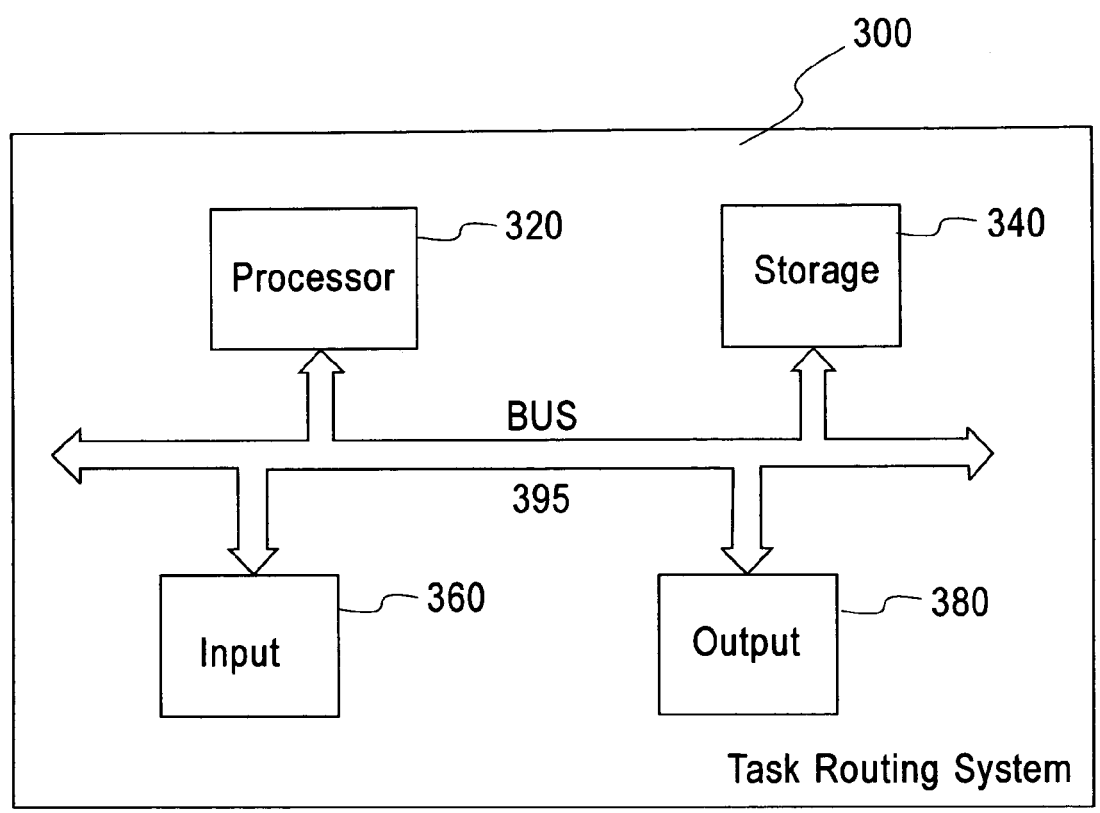
FIG. 2 shows an exemplary task routing system embodying the exemplary aspects of the present invention.

FIG. 2 shows an exemplary task routing system 300 embodying the exemplary aspects of the present invention. As shown in FIG. 2, the task routing system 300 includes a processor 320, a storage device 340, an input device 360 and an output device 380, all connected by bus 395.

During initialization of the voice processing system 300, the processor 320 adjusts the parameter settings, and writes the configuration to the configuration file 310. In the various aspects of the present invention, to achieve efficient resource utilization, for example, the processor 320 selects the set of engines from the engines 511–513, 521–523 and 531–533 by reviewing the parameter settings for the engines in the memory 340 or the configuration file 310. These parameters include, for example, the number of sets of engines and the number of engines in each set, the subtasks allocated to each set of engines, the performance/accuracy setting for each set of engines, the grammar setting for each set of engines, and the acoustic model setting for each set of engines. To select the set of engines, the processor 320 then takes into consideration, for example, the activation rates of each subtask, the computing resources and memory required for each subtask for each possible performance/accuracy setting, the impact on the overall application performance of each possible performance/accuracy setting for each subtask, and the like.

A large voice processing application may be made of several, often many sub-tasks of varying complexity. Thus, in accordance with various exemplary embodiments of this invention, in large voice processing applications such as speech recognition and speech synthesis, for example, the processor 320 may select a set of engines from the engines 511–513, 521–523 and 531–533 to perform a task by selecting a configuration in which resource usage may be traded for performance. For example, speed may be traded for recognition accuracy, or memory usage may be traded for speech quality.

In a speech recognition application, for example, subtasks may include confirmation dialogs of "YES" or "NO", commands, dates, numbers, name recognition, natural language recognition, large list recognition such as stock names, book titles, and the like. In accordance with the various exemplary embodiments, for a speech recognition application, for each sub-task, different trade-offs between resource and performance may be implemented. For example, simple subtasks may operate in the low-resource and high accuracy region, while complex subtasks which are more resource-intensive and recognition may be less accurate. Furthermore, some sub-tasks may be more critical than others to the overall performance and usability of the application, and thus, may require very high recognition accuracy.

In the various exemplary embodiments of the present invention, the processor 320 selects a set of engines from the engines 511–513, 521–523 and 531–533 to perform a task while implementing the trade-off between the resources required to perform a task and the performance of the task based on the configuration of the sets of engines received from the configuration file 310. In these embodiments, the processor 320 assigns different sets of sub-tasks to different sets of engines from the engines 511–513, 521–523 and 531–533 running on servers 510–530 by selecting engine types defining sets of engines which have identical configurations. The processor 320 then assigns the received request from terminals 110–160 to the first available engine within the selected set.

In operation, the processor 320 of task routing system 300 receives the incoming request from a user at a terminal 110–160 through the input device 360. The processor 320 then selects the set of engines from the engines 511–513, 521–523 and 531–533 in the task servers 510–530 to perform the task based on the configuration of the sets of engines received from the configuration file 310 through the input device 360. The processor 320 then routes the request to one available engine in the selected set of engines in task servers 510–530 through output device 380. The returning results from the request are collected from the selected engine of task servers 510–530 through the input device 360 and are sent back to the user at the requesting terminal 110–160 through output device 380.

Although FIG. 2 shows a particular form of task routing system, it should be understood that other layouts are possible and that the various aspects of the invention are not limited to such layout. Thus, it should be appreciated that though FIGS. 1 and 2 show that the configuration file 310 is separate from the task routing system 300, the exemplary embodiments of the present invention is not limited to such layout. For example, it should be appreciated that the configuration file may be comprised within the task routing system 300. In such embodiment, the task routing system 300 will receive the configuration file 310 from the memory 340 to base its selection of the engines.

It should be appreciated that the application from the application controller 400 itself may specify the engine type along with the request. In such embodiment, the processor 320 determines an available engine of the engine type specified by the application.

In an exemplary embodiment, the processor 320 may designate all engines with the same engine type run on the same physical task server 510–530 in order to share resources, such as memory, efficiently, for example.

In an exemplary embodiment, the processor 320 may determine the selected set of engines from the engines 511–513, 521–523 and 531–533 by considering the activation rate of each subtask. In the configuration file 310, the processor 320 may instruct the servers, by way of the configuration file 310, to create more instances of engines of types which are used more often.

In this exemplary embodiment, to deploy an application, the processor 320 selects the set of engines from the engines 511–513, 521–523 and 531–533 to achieve acceptable performance with minimum resources. For example, the processor may select the set of engines with tighten parameters and slow frame rate for more complicated tasks, while assigning the easy tasks to engines with lossy parameters and faster frame rate. That is, since a faster frame rate needs less computation and has a shorter latency, more engines may be run using less computation space at the faster frame rate, and thus, the faster frame rate may be used for simple tasks.

In another exemplary embodiment of the present invention, the processor 320 may determine the selected set of engines based on task-dependent models stored in the record of engines 511–513, 521–523 and 531–533 in the memory 340 or the configuration file 310. In this exemplary embodiment, for a speech application, for example, to achieve better performance for the given speech application, different acoustic models may be activated for different engine types. For example, customized acoustic models, or task-specific acoustic model, may out-perform general purpose acoustic models, while an alphanumeric model may perform much better for phone number recognition or a proper name model may out-perform general purpose model for name recognition. In this exemplary embodiment, utterances may be decoded using the task specific acoustic model by the processor 320 selecting the associated engine type.

Similarly, in Text-To-Speech (TTS) applications, the processor 320 may select a set of engines from the engines 511–513, 521–523 and 531–533 to perform a task based on the foot print of the TTS model used. For example, a more natural TTS speech may require more training data to build a larger TTS model to handle all the transition phones and word boundary than a less natural TTS model. In additions the gender of the speech may be subject to application preference. Therefore, the processor 320 may select a set of engines according to the model associated with the engines 511–513, 521–523 stored in the memory 340 or the configuration file 310.

In yet another exemplary embodiment of the present invention, for speech recognition applications, for example, the processor 320 may determine the selected set of engines from engines 511–513, 521–523 based on separate configurations for grammar-based and n-gram-based recognition in the memory 340 or the configuration file 310. In speech recognition applications, due to the differences between grammar and n-gram language model decoding, different parameters configurations may be assigned to different engine types and used by the processor 320 for selection.

For example, in a natural language conversation application, for an open-ended dialogue like "how can I help you?", an n-gram based language model speech recognition approach may be applied, while, at other times, for applications where an answer is selected from a list, such as, "what fund do you want to buy?", or "what's your account number?", a grammar-based listing recognition may be best suited for the users' response.

In the above exemplary embodiment, the processor 320 may select the engines based on configurations of the engines stored in memory 340 or the configuration file 310. However, it is to be appreciated that the various exemplary aspects of the present invention is not limited to such layout. That is, accordance to the various aspects of the present invention, the processor 320 may use any classical optimization techniques to determine the best engines for resource allocation based on the above described criteria.

In an exemplary embodiment of the present invention, the processor 320 may determine the selected set of engines from engines 511–513, 521–523 based on priority caching of large grammars. Various applications such as speech recognition applications involve several hundred or even thousand grammars, and therefore, it may be take longer time to load larger grammars into the memory then smaller grammars. According to this exemplary embodiment of the present invention, to achieve better memory management and reduce the average latency, for example, grammars with similar size may be grouped together and assigned to different engine types. In accordance with this exemplary embodiment, engine types with large grammars keep all grammars in memory, while engine types with smaller and seldom used grammars allow swapping of the grammars.

Further, in accordance with an exemplary embodiment, in a multiple server application, the memory from each task server 510–530 may be managed together by the task routing system 300 with a routing utility to minimize the requirement of memory swapping. Thus, different groups of grammars will be handled/cached by different servers, and if each server 510–530 needs to handle any speech recognition task, it must be able to all hold all of the largest grammars in main memory, and needs to be dimensioned accordingly.

Thus, in an application such as a speech recognition application, grammars may be very large, depending on the richness of the content that needs to be recognized, such as the names of all the inhabitants of a city, or of a country, or all the book titles from a given publisher, or the like. Such grammars need to reside in the main memory of the voice processing system 1000, because they are too large to be quickly loaded by the speech recognition engine at the time they are needed, and would otherwise cause unacceptable delays for the user of the speech-enabled application.

In another exemplary embodiment of the present invention, the processor 320 may determine the selected set of engines from engines 511–513, 521–523 automatically based on usage statistics. In this exemplary embodiment, the processor 320 may develop a simple auxiliary file adapted from the initial configuration from the configuration file 310, store the auxiliary file in the memory 340, and update the content of the auxiliary file periodically. In this exemplary embodiment of the present invention, the configurations in the auxiliary file, such as the number of engines running grammars used, may be automatically adapted periodically according to the usage statistics to enhance the system performance. These content changes include alterations to respond to changes in the requirements, or real-time operating statistics. For example, in a telephony-based system, statistics on the number of calls per hour, and about type of calls such as information, customer service, and the like, may be used to adjust the configurations of the auxiliary file.

It should be appreciated that, in the various exemplary embodiments of the present invention, the processor 320 may use any classical optimization techniques to determine the best engines for resource allocation based on the above described criteria. For example, the processor 320 may express the resource allocation problem in mathematical terms and solve the problem using classical optimization techniques. It should be appreciated that the various exemplary aspects of the present invention are not limited to a particular optimization technique.

FIG. 3 shows an exemplary configuration file in association with a task routing system according to the exemplary aspects of the present invention. As shown in FIG. 3, the configuration file 310 defines the different types of engines for each server 510–530. In accordance with various aspects of the present invention, upon initializing, the application controller 400 uses the configuration file 310 to initialize the engines 511–513, 521–523 and 531–533 for all servers 510–530. It should be understood that the task servers 510–530 may also read the configuration file 310 and configure themselves as specified therein. In operation, the task routing system 300 then uses the configuration file 310 to route the input request to a selected engine to optimize the performance and resources, for example.

As shown in FIG. 3, the configuration file 310 includes a record for each of the servers 510–513. As shown in FIG. 3, each of the servers 311 is associated with a number of engines and engine types 312, wherein each of the engines is assigned a grammar type 313, an accuracy reading 314, and an acoustic model 315.

For example, as shown in FIG. 3, in the configuration file 310, server 510 supports 2 instances of type A engines and 1 instance of type B engine, where the type B engine is assigned a "yes/no" grammar, an accuracy of "80", and a "general" acoustic model. In contrast, type A engines are configured with "NY cities" and "NJ cities" grammars, an accuracy of "35" and a "names" acoustic model.

Similarly, as shown in FIG. 3, in the configuration file 310, server 520 supports 1 instance of type A engines, 2 instances of type B engines, and 1 instance of type C engine, where the type C engine is assigned a "numbers" grammar, an accuracy of "50", and an "alphanumeric" acoustic model.

Though the exemplary embodiment above describes configuration file 310 in a particular embodiment, it should be appreciated that the configuration file 310 may be any type of file known in the art for maintaining a record of data. Thus, it is contemplated that the configuration file may include various layouts known to those skilled in the art.

For example, although FIG. 3 depicts a definite number of columns and rows, it should be understood that various layouts may also be applied in the various aspects of the invention, and that the present invention is not limited to the number of columns and rows. For example, a Text-To-Speech application or a speaker identification application will have different tasks and will not be limited to the particular layout depicted in FIG. 3. Instead, the columns for a Text-To-Speech application, for example, may include parameter settings for the size of the model, voice type such as the gender of the voice, and the like. Similarly, the columns for a speaker identification application may also include parameter settings for the user population and the like.

Further, it is to be contemplated that the configuration file 310 is not limited to a particular number of task servers, engines number or types, grammar values, accuracy reading, or acoustic models as set forth in FIG. 3.

Figure 4:
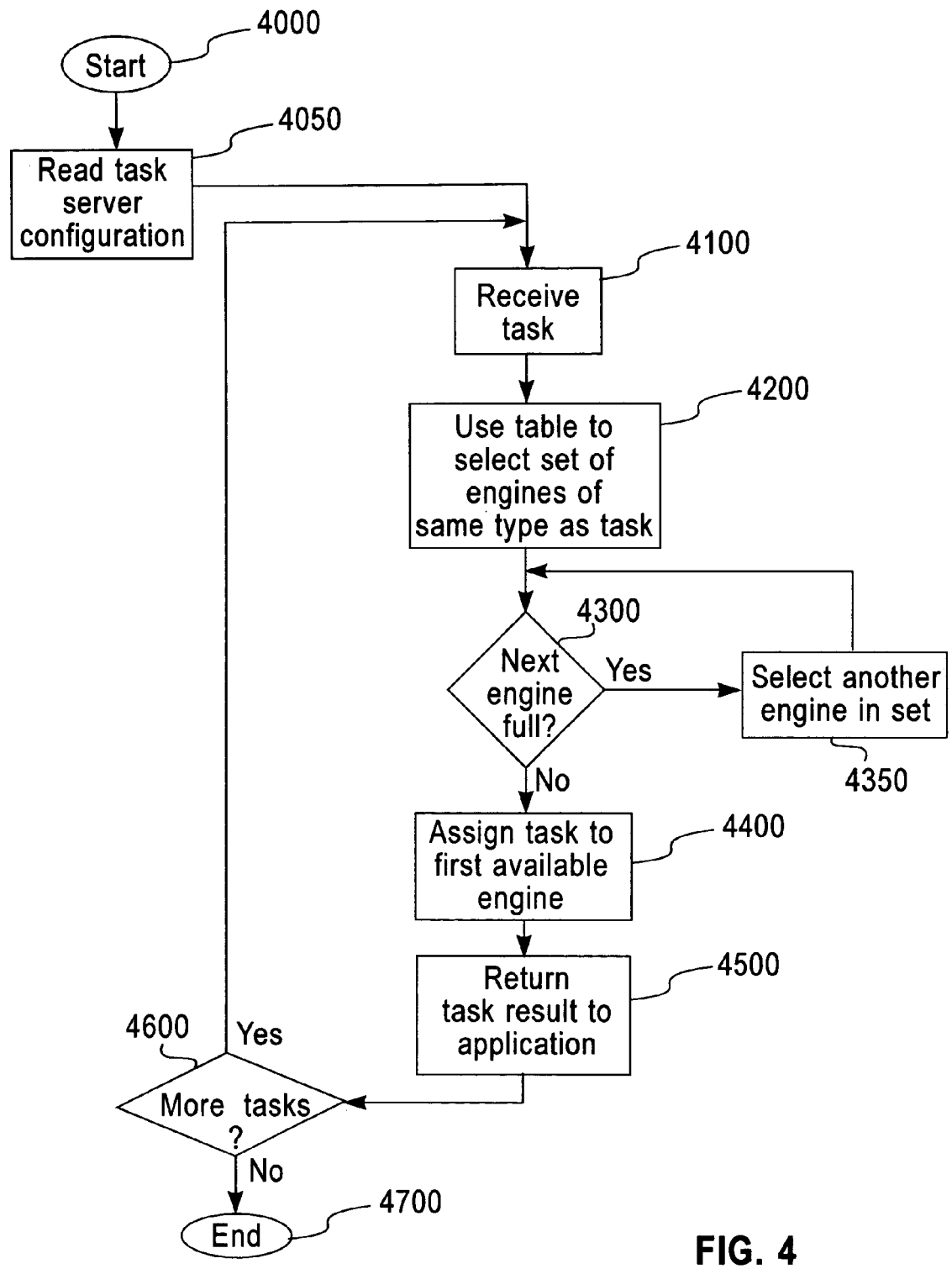
FIG. 4 shows a flowchart of an exemplary method for task routing in accordance with the exemplary aspects of the present invention

FIG. 4 shows a flowchart of an exemplary method for task routing according to the various exemplary aspects of the present invention. Beginning at step 4000, control proceeds to step 4050, where task server configurations are read by the task routing system from a configuration file. In accordance with these various exemplary aspects of the present invention, the configurations include parameter settings for the plurality of types of engines running on the task servers. Next, in step 4100, the task is received by the task routing system. Next, in step 4200, in the task routing system, the task is analyzed against the read configurations, and the set of engines of the same type of the task is selected. That is, the task routing system makes its selection based on the parameter settings for each type of engines. Control then proceeds to step 4300.

In step 4300, control determines whether an engine on the selected set of engines is full. If the engine is full, then the engine is unavailable for the task, and control proceeds to step 4350. Else, the engine is available and control jumps to step 4400. In step 4350, another engine from set of engines of the same type of the task is selected from the file, and control then returns to step 4300.

In step 4400, the task is assigned to the first available engine in the selected set of engines to perform the task. Next, in step 4500, the task result is returned to the application controller. Then, in step 4600, control determines whether there are more tasks. If there are more tasks, control returns to step 4100. Else, there are no more tasks and control jumps to step 4700 where the process ends.

The foregoing description of the invention has been presented for purposes of illustration and description. It is not intended to be exhaustive or to limit the invention to the precise form disclosed, and other modifications and variations may be possible in light of the above teachings. Thus, the embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A voice processing system comprising:
   a task routing system; and
   a plurality of task servers connected to the task routing system through a data network, the task servers comprising a plurality of engines in said task servers, said engines being of a plurality of types for processing voice input; and
   a configuration file connected to the task routing system comprising a record of a configuration of sets of the plurality of engines and parameter settings for each type of engine, wherein the task routing system determines characteristics of the voice input and selects a set of the plurality of engines to process incoming voice input based on the determined characteristics of the voice input and on the types of engines in the configuration file.

2. The voice processing system of claim 1, wherein the parameter settings for each type of engine differ from the parameter settings of other types of engines.

3. The voice processing system of claim 1, wherein the parameter settings comprise a plurality of grammar types.

4. The voice processing system of claim 1, wherein the parameter settings comprise a plurality of accuracy readings.

5. The voice processing system of claim 1, wherein the parameter settings comprise a plurality of acoustic models.

6. The voice processing system of claim 1, wherein the parameter settings comprise a plurality of model sizes.

7. The voice processing system of claim 1, wherein the parameter settings comprise voice types.

8. The voice processing system of claim 1, wherein the parameter settings comprise user population.

9. The voice processing system of claim 1, wherein the task routing system updates the parameter settings based on usage Statistics.

10. A method for task routing comprising:
    inputting a task comprising voice input with at least one input characteristic;
    based on parameter settings in a configuration file, comprising a record of a configuration of sets of a plurality of engines and parameter settings, selecting and dynamically allocating a set of engines disposed in a plurality of task servers for processing voice input from a plurality of engines of a plurality of types, the selected set of engines being of a type to process voice input with said at least one input characteristic; and
    assigning the task to the selected set of engines.

11. The method of claim 10, wherein the parameter settings for each type of engine differ from the parameter settings of other types of engines.

12. The method of claim 10, wherein the parameter settings comprise a plurality of grammar types.

13. The method of claim 10, wherein the parameter settings comprise a plurality of accuracy readings.

14. The method of claim 10, wherein the parameter settings comprise a plurality of acoustic models.

15. The method of claim 10, wherein the parameter settings comprise a plurality of model sizes.

16. The method of claim 10, wherein the parameter settings comprise voice types.

17. The method of claim 10, wherein the parameter settings comprise user population.

18. The method of claim 10, wherein the task routing system updates the parameter settings based on usage statistics.

* * * * *